UNITED STATES PATENT OFFICE.

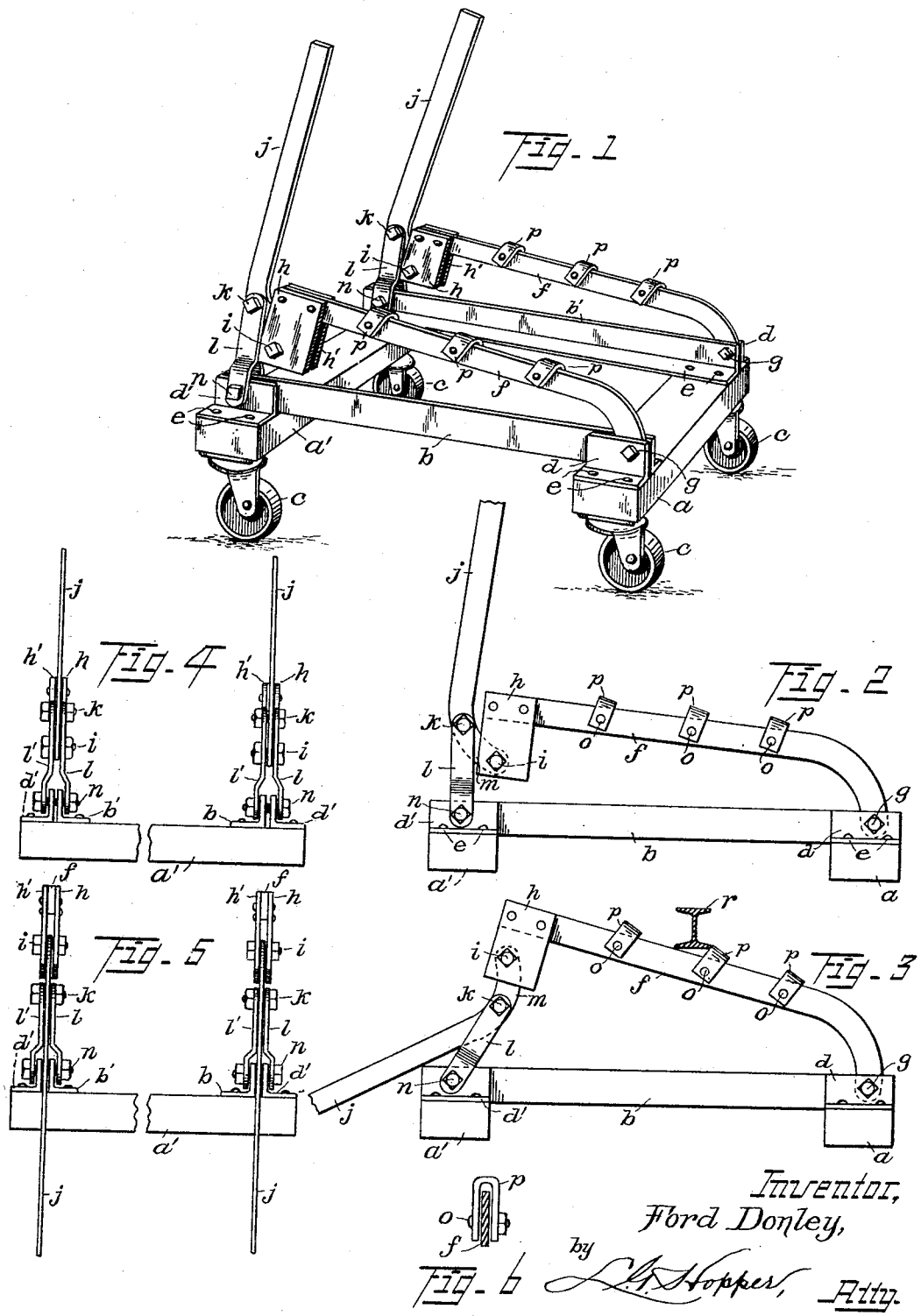

FORD DONLEY, OF CLEVELAND, OHIO.

JACK TRUCK.

1,403,851.  Specification of Letters Patent.  Patented Jan. 17, 1922.

Application filed June 5, 1918. Serial No. 238,245.

*To all whom it may concern:*

Be it known that I, FORD DONLEY, of Cleveland, in the county of Cuyahoga and State of Ohio, have invented new and useful Improvements in Jack Trucks, of which the following is a specification.

This invention relates to lifting jacks mounted upon warehouse or factory trucks, and is especially adapted to lifting and moving automobile vehicles.

The prime object of the present invention is to provide a universally movable castor-truck with twin jacks having simple, convenient, swift and powerful elevating mechanisms, said jacks being independently manipulated and capable of co-operation. Further aims are to accomplish ever ready adjustment of a jack-truck to properly and positively engage vehicle axles, or other objects to be lifted, which stand at various heights from the floor; to provide speedy lifting, locking and releasing jacks capable of quick and easy manipulation by hand or foot; and to produce jack-trucks of the greatest efficiency and convenience particularly adapted for use in automobile vehicle factories, garages and warehouses.

Minor objects will become apparent from the following description of a preferred embodiment of the invention, reference being had to the accompanying drawing, in which—

Fig. 1 is a view in perspective of the jack-truck.

Fig. 2 is a side elevation of one of the jacks in its normal lowered position; and Fig. 3 shows the same in its raised position.

Fig. 4 is an end elevation of Fig. 2; and Fig. 5 is an end elevation of Fig. 3.

Fig. 6 shows one of the retaining links in detail.

The reference letter $a$ indicates the front, and $a'$ the rear stringer of the truck frame, said stringers being preferably of hard wood secured and spaced apart by angle irons $b$ and $b'$ superimposed thereon near the ends of the stringers respectively, so as to form a substantially rectangular frame. The truck frame is mounted upon four strong castors $c$, one beneath each end of the stringers $a$ and $a'$, said castors being alike, and of the usual or any suitable type of flanged topped construction, but roller or ball bearing swivels therein are preferred.

Short angle irons $d$ and $d'$ are placed upon the ends of the stringers $a$ and $a'$ respectively opposed to and matching the frame irons $b$ and $b'$, but spaced somewhat apart from the latter. The top flange of each castor $c$ is secured to the frame by four bolts $e$ passing through the stringers $a$, or $a'$, as the case may be, the outer pair of said bolts engaging also the lateral wing of one of the short irons $d$ or $d'$, and the inner pairs of bolts serving to clamp the crossbars $b$ and $b'$ to the stringers $a$ and $a'$ respectively. Thus the castor bolts $e$ are all alike, and the inside pairs of them hold the frame together rigidly, so that it may be trundled about in any direction.

Two sets of lifting devices independently operated by levers compounded with a toggle joint are employed, one set being secured to the bar $b$, and the other to the bar $b'$; and, as said sets are alike in all respects, I shall proceed to describe one of them using the same reference characters to indicate corresponding parts of both sets.

A bridge bar $f$, preferably of flat section steel, has its forward end curved downward and inserted between the angle bars $d$ and $b$, or $b'$, its bent end being fulcrumed on a bolt or pin $g$ passed through the upright wings of both said angle bars. The rear end of the bar $f$ has a pair of depending plates $h$ and $h'$ riveted thereto as shown, or otherwise rigidly secured or made integral therewith, so as to form a forked bearing therein for a bolt or pin $i$. A hand-lever $j$ is fulcrumed on a bolt or pin $k$ between the upper ends of a pair of supporting links $l$ and $l'$, and terminates in a short arm $m$ bent inwardly between the plates $h$ and $h'$, and journaled on the bolt $i$. The lower ends of the links $l$ and $l'$ are offset to straddle the upright flanges of the angle-bars $b$, or $b'$, and $d'$, being hinged thereto by a bolt or pin $n$.

One or more, but preferably a plurality of retaining, or stop links $p$ are mounted to rock upon the lift-bar $f$; said links being U-shaped, straddling the bar, and loosely pinned, bolted or riveted thereto at $o$, like a shackle or clevis, although they should be formed of flat sectioned steel, as shown in Figs. 1, 2, 3 and 6.

When not in use, the device stands normally in position substantially as shown in Figs. 1, 2 and 4, with the hand-levers *j* inclined slightly forward, and the plates *h* and *h'* stopped against their respective links *l* and *l'*. The truck as shown in Fig. 1 may be pushed to the right beneath the object to be raised, such, for example, as the axle of a vehicle *r*, Fig. 3, until stopped by the engagement of *r* with a pair of the rocking links *p* on the inclined bars *f*, or until the upper pair of said links are cleared. Then, according as it is desired to raise one or both ends of the axle *r*, one or both hand-levers *j* are swung back and downward to the position shown in Figs. 3 and 5, which compounds the leverage of *j* and *f* with that of the toggle joint at *k*; thus raising a heavy weight *r* on the inclined bridge-bar *f* with a comparatively light pressure on the hand-lever *j*.

As the rear end of the bar *f* rises its inclination becomes greater, causing the truck to move backward until one of the links *p* intercepts and retains the axle *r* thereon, as in Fig. 3. When the hand-lever *j* is stopped against the truck frame, the center of joint *k* has moved somewhat past a center line drawn through *i* and *n*; which disposition of relative positions of the members locks the levers positively against further movement in either direction until the lever *j* is raised by the hand or foot of the operator.

It should now be readily understood that with this device one or both wheels of an automobile, or other vehicle axle, may be instantly lifted from and held above the floor quiescently, or shifted from side to side, for the purpose of repairs, assembling, moving cars in any direction in close storage quarters, saving tires by taking the weight of the vehicle off them; and that the device may be applied to many other uses, singly or in pairs, where quick lifting or carrying of heavy objects is desired.

I further point out and distinctly claim as my invention:—

1. The combination of a castor-truck frame, an inclined bridge bar bent downward and hinged to the frame at its lower end, a fork fixed to and depending from the upper end of said bridge bar, a hand-lever having an inwardly inclined angle-arm hinged at its termination to said fork, and a rocking link connection between the angular bend of the hand-lever and the frame.

2. In a jack-truck, a rectangular frame comprising lateral stringers mounted on castors and longitudinal angle-bars superimposed thereon, inclined load supporting bars bent downward and hinged at their lower ends to the forward ends of said angle-bars respectively, and connecting means hinged to the rear ends of said angle-bars respectively by which leverage may be applied to raise the higher ends of said load supporting bars independently of each other.

3. In a device of the class described, a frame, an inclined bridge bar hinged to said frame at its lower end and provided with means for lifting its higher end, and one or more load retaining links rockable on said bridge bar and hinged thereto.

4. In a device of the class described, an inclined bridge bar hinged to supporting means at its lower end and provided with means for lifting its higher end; and one or more load retaining links on said bridge bar; said links being U-shaped, embracing the upper side of the bridge bar and hinged thereto so as to rock lengthwise thereof.

In testimony whereof I affix my signature in the presence of two subscribing witnesses, at Cleveland, Ohio, this 31 day of May, 1918.

FORD DONLEY.

Witnesses:
G. A. CAMPBELL,
RAYMOND B. HOPPER.